P. D. CROSBY.

Improvement in Method of Securing Tires to Carriage Wheels.

No. 124,937. Patented March 26, 1872.

Phineas D. Crosby
Inventor 124,937

UNITED STATES PATENT OFFICE.

PHINEAS D. CROSBY, OF DANBURY, CONNECTICUT.

IMPROVEMENT IN METHODS OF SECURING TIRES TO CARRIAGE-WHEELS.

Specification forming part of Letters Patent No. 124,937, dated March 26, 1872.

*To all whom it may concern:*

Be it known that I, PHINEAS D. CROSBY, of Danbury, in the county of Fairfield and State of Connecticut, have invented a new Improvement in Method of Securing Carriage-Wheel Tires; and I do hereby declare the following, when taken in connection with the accompanying drawing and the letters of reference marked thereon, to be a full, clear, and exact description of the same, and which said drawing constitutes part of this specification, and represents, in—

Figure 1:
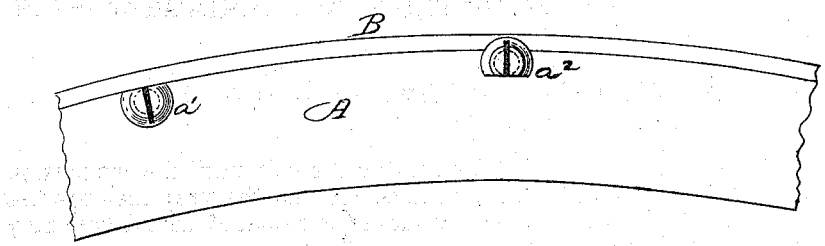
Figure 2:
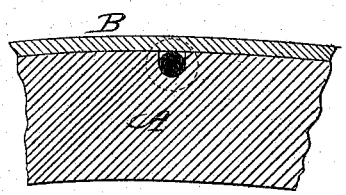
Figure 3:
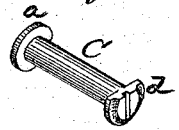

Figure 1, a side view of one of the fastening devices, as in position for holding the tire, the other in position for removing the tire; Fig. 2, a longitudinal central section of the felly, showing a transverse section of the securing device; Fig. 3, a perspective view of the securing device detached; and in Fig. 4 a top view of the felly with the securing device inserted.

This invention relates to an improvement in method of securing tires to carriage-wheels, the object being to dispense with the riveting or bolting, as heretofore practiced, and so that when occasion requires the tire may be readily removed. As the tire fits closely to the felly, it follows that only the strain or tendency to removal is transversely across the felly. The boring of the tire, as for bolting or riveting, weakens the tire to an extent proportionate to the size of the perforation, thereby rendering the tire much more liable to break than would be the case were the perforation not there. By my invention this liability is avoided, and it consists in the arrangement, transversely across or below the face of the felly, of a double-headed bolt, the heads of which extend up to embrace both edges of the tire, and a portion of one or both of the heads cut away, so that by turning the bolt until the cut portion of the head comes next the tire; then the tire may be removed or replaced as the case may be.

Figure 4:
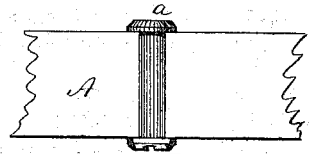

A is the felly, and B the tire of a common carriage-wheel. C, Fig. 2, is a bolt, in length equal to the thickness of the felly and width of the tire, and constructed with two heads, $a$ and $d$. This bolt is set into the felly transversely across its face, as seen in Fig. 4, and in section, Fig. 2; the bolt denoted in solid black, Fig. 2. One or both of the heads—here represented, as one, $d$—has one side cut away, so that when in the position denoted at $a^1$, Fig. 1, the cut surface of the head will be flush with or slightly below the face of the felly. In this position the tire is set upon the wheel in the usual manner, then the bolts are turned to the position denoted at $a^2$, Fig. 1, both heads embracing opposite edges of the tire, thus preventing any transverse movement of the tire, and firmly securing it in position without perforation or otherwise weakening the tire. The bolt fits in the felly sufficiently close to be prevented from accidental turning, but if desired preventive devices may be applied.

For convenience of turning the bolt I prefer to slit one here, as denoted in the drawing, but equivalent devices may be employed for this purpose.

I claim as my invention—

The method herein described of securing tires to carriage-wheels, consisting of the double-headed transverse bolt C, arranged and applied substantially in the manner set forth.

PHINEAS D. CROSBY.

Witnesses:
ALSON J. SMITH,
LUMAN L. HUBBELL.